(12) United States Patent
Vandivere

(10) Patent No.: US 11,657,633 B1
(45) Date of Patent: *May 23, 2023

(54) RIGHTS MAPPING SYSTEM AND METHOD

(71) Applicant: ThoughtTrace, Inc., Magnolia, TX (US)

(72) Inventor: Nicholas E. Vandivere, Spring, TX (US)

(73) Assignee: ThoughtTrace, Inc., Magnolia, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/229,616

(22) Filed: Apr. 13, 2021

Related U.S. Application Data

(63) Continuation of application No. 16/188,689, filed on Nov. 13, 2018, now Pat. No. 10,984,231.

(60) Provisional application No. 62/584,539, filed on Nov. 10, 2017.

(51) Int. Cl.
| | |
|---|---|
| *G06K 9/62* | (2022.01) |
| *G06V 30/414* | (2022.01) |
| *G06Q 50/16* | (2012.01) |
| *G06F 16/901* | (2019.01) |
| *G06V 30/412* | (2022.01) |
| *G06V 30/413* | (2022.01) |
| *G06V 30/10* | (2022.01) |

(52) U.S. Cl.
CPC ........ *G06V 30/414* (2022.01); *G06F 16/9024* (2019.01); *G06K 9/6256* (2013.01); *G06Q 50/163* (2013.01); *G06V 30/412* (2022.01); *G06V 30/413* (2022.01); *G06V 30/10* (2022.01)

(58) Field of Classification Search
CPC ........... G06K 9/00463; G06K 9/00456; G06K 9/6256; G06K 9/00449; G06K 2209/01; G06F 16/9024; G06Q 50/163
USPC ........................................................ 382/176
See application file for complete search history.

(56) References Cited

U.S. PATENT DOCUMENTS

| | | | | |
|---|---|---|---|---|
| 2003/0004885 | A1* | 1/2003 | Banerjee | G06Q 30/06 705/52 |
| 2008/0294616 | A1* | 11/2008 | Schwalb | G06F 16/2468 707/999.005 |
| 2015/0286630 | A1* | 10/2015 | Bateman | G06V 30/413 704/9 |
| 2017/0337562 | A1* | 11/2017 | Gilmore | G06Q 50/165 |
| 2018/0365593 | A1* | 12/2018 | Galitsky | G06N 20/00 |
| 2019/0386969 | A1* | 12/2019 | Verzun | H04L 9/0662 |

* cited by examiner

*Primary Examiner* — Ali Bayat
(74) *Attorney, Agent, or Firm* — Polsinelli PC

(57) ABSTRACT

A method and system can include processing title and title opinion document images to generate text information. Trained models may generate data objects representative of period of time during which certain rights to a property exist. The trained models may also generate rules for modifying the data objects and interrelating the data objects to each other. In some examples, a confidence level can be generated and will reflect a likelihood of a data object including correct information. The modified and interrelated data objects may be used to generate a navigable interface which includes a current title status for a property and a navigable chain of title reflecting historical rights to the property.

24 Claims, 7 Drawing Sheets

RIGHTS MAPPING SYSTEM AND METHOD

CROSS-REFERENCE TO RELATED APPLICATION

This application is a continuation of U.S. patent application Ser. No. 16/188,689 filed Nov. 13, 2018 entitled "Rights Mapping System and Method," which claims priority under 35 U.S.C. § 119(e) to U.S. Patent Application No. 62/584,539 filed Nov. 10, 2017 entitled "RIGHTS MAPPING SYSTEM AND METHOD," the entire contents of which are incorporated herein by reference for all purposes.

TECHNICAL FIELD

The present invention relates to natural language processing of documents related to a chain of title.

BACKGROUND

Knowing the ownership status and current interests in property is of paramount importance to many fields involving resource exploration and extraction such as mining, lumber, and oil and gas, to name a few. The same is true for other property assets such as patents and patent applications, and other intellectual property. In the context of real property, individuals and organizations expend a great amount of resources obtaining, reviewing, and processing title documents, wills, deeds, death certificates, probate determinations, affidavits of heirship, and other documents related to determining a current status of ownership and interests in parcels of land. Even when such documents are in the possession of a company, it can take large teams countless hours to sort, review, and properly analyze each document, which may be very old, of poor legibility, use nonstandard or outdated terms, and/or be unclearly dated. In the energy industry, for example, it is necessary to ensure that all of the property rights have been converged through all land transactions before drilling or production may occur. Incorrect or slow production of the documents in the chain of title for the land can be deleterious initiating drilling or production, bringing a product to market, or result in litigation over challenged property rights.

It is with these observations in mind, among others, that aspects of the present disclosure were concerned and developed.

SUMMARY

Embodiments of the invention concern methods and systems for training machine learning models over distributed data sets. In one embodiment of the invention, a method includes accessing, by a processor, one or more electronic documents, providing, by the processor, text of the electronic documents to a trained model to generate a first data object and a second data object, each data object having a property right, a length of time, and a location, generating, by the processor, a relationship between the first data object and the second data object, the relationship associated with a change in property rights associated with the location, and generating, by the processor, a description of current property rights to the location based on one of first data object, the second data object, or the relationship, and the description having a predicted property right interest in the location.

In one embodiment, a system includes one or more hardware processor, and a memory storing instructions operable by the one or more hardware processors to access one or more electronic documents, provide text of the electronic documents to a trained model to generate a first data object and a second data object, each data object including a property right, a length of time, and a location, generate a relationship between the first data object and the second data object, the relationship associated with a change in property rights associated with the location, and generate a description of current property rights to the location based on one of first data object, the second data object, or the relationship, and the description including a predicted property right interest in the location.

In one embodiment, method for determining ownership interests in a property includes receiving, by a processor, electronic documents related to one or more property rights of one or more parties, identifying, by the processor, a series of past property rights and identifications of preceding parties possessing the past property rights, generating, by the processor, a current title status based on the series of past property rights and preceding parties and generating, by the processor, a navigable interface including the series of past property rights, the identifications of the preceding parties, and the current title status, wherein a user navigates a title history of a property through the navigable interface, the property associated with the one or more property rights.

DETAILED DESCRIPTION

Figure 1:
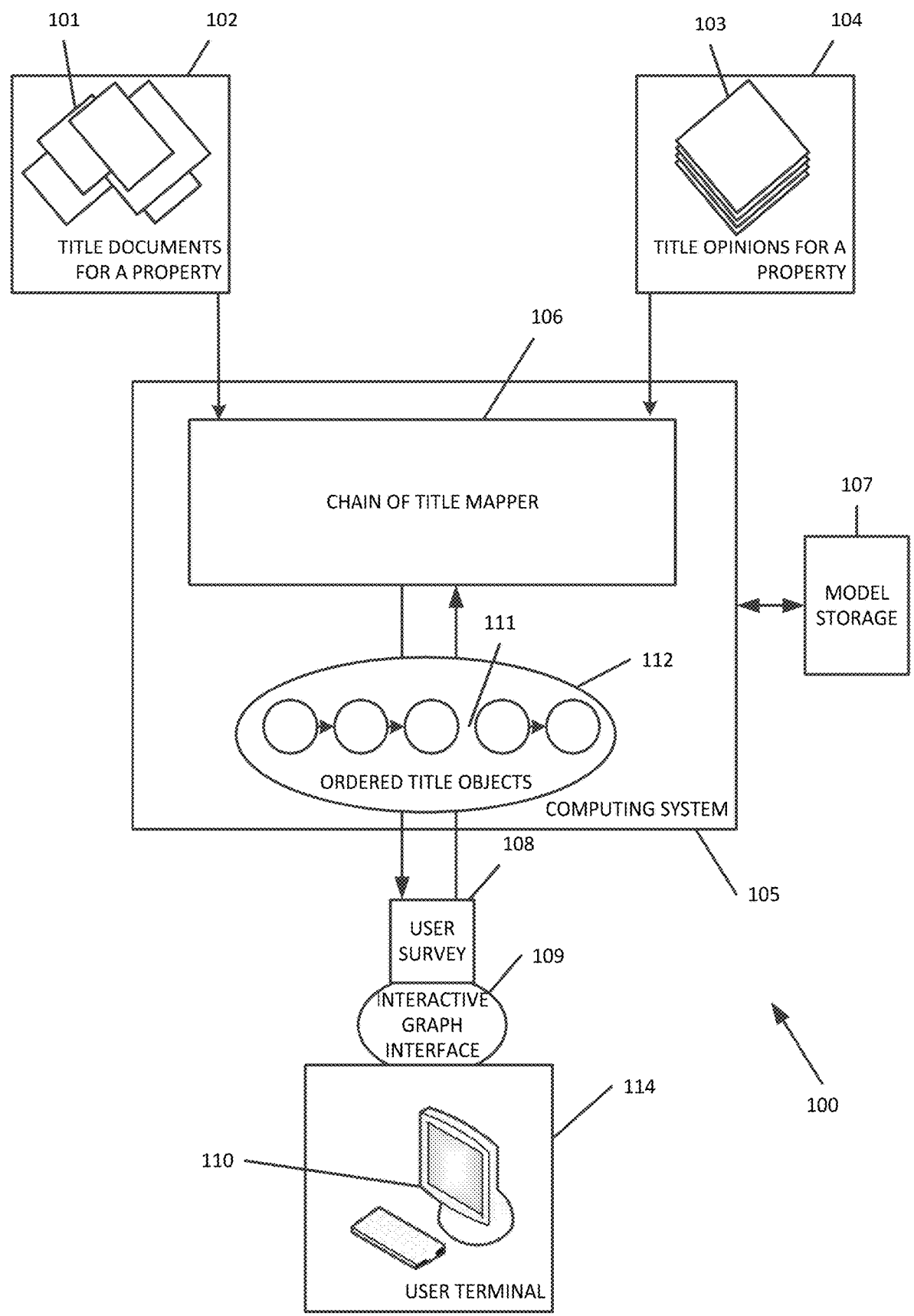
FIG. 1 is a system diagram for a natural language processing system for documents, such as title documents and other documents related to property interests, in accordance with various embodiments of the subject technology.

Aspects of the present disclosure involve systems and methods for automatically analyzing documents associated with title to some form of property along with various other rights associated with the property, and automatically generating a chain of title map (and other rights) based on interconnected data objects generated from a collection of electronic documents. The generated chain of title map includes a structured organization of electronic documents associated with a property over time, and so the generated chain of title map can be used to determine the origin of title and rights in the property as well as past conveyance(s) of title and rights in the property. Further, confidence levels can be associated with the determined past conveyances, indicating a level of reliability of estimated changes in title and rights.

The chain of title map may be presented and manipulated through a user interface. The linked data structures are generated through natural language processing ("NLP") based on a combination of machine learning and rule-based logic. A machine learning model ("model") can use learned ontologies to identify a date and/or timing of a document from the natural language found within, which may then be converted into a standard format. The same or another model can also use learned ontologies to identify rights and/or rules related to rights (e.g., the instructions of a will, etc.), which may also be converted into a standard format. Rule-based logic may then be applied to the formatted timing, rights, and other information produced by the one or more models in order to generate a data structure of interconnected objects which each contain a state of various property rights at a point (or span) in time.

The system may analyze any sort of document related to a property interest, including, without limitation, a deed, a last will and testament, a death certificate, a probate determination, an affidavit of heirship, and other title documents. In many instances, the documents are available in paper form, and after some form of processing, are converted into electronic document images in various possible formats, including, but not limited to PDF, JPG, PNG, TIFF, and the like, but the document images are neither sorted in any particular order (chronological or otherwise) nor are the documents electronically associated with a time of their legal effectiveness through, for example, metadata, etc. Instead, a document may be or may be made available in electronic form but its relationship to a property and its relationship to other documents defining rights in that property are unorganized.

The systems and methods disclosed herein can also generate a chronological history of party interests in a property regardless of the order the documents are provided or the format or terminology of the documents. A party may have various interests in a property. For example, a party may have mineral rights, subsurface rights, various surface rights, and the like. Furthermore, rights to a property may be conveyed either alongside title or independently of title. Systems set out herein can analyze and organize such documents. A more detailed discussion of these systems and methods follows below.

The system provides access to the interconnected data objects through an interface including interactive nodes in a directional graph, with each node representing one or more property interests in a parcel of land at either a discrete point in time or over a span of time. Each connection between the nodes (each edge), represents a change in interests in the property and can be color-coded to represent different levels of confidence (of the system) in the veracity of the respective change in interests. The present disclosure illustrates aspects of the technology in relationship to property interests in a parcel of land (e.g., land title). However, it is to be appreciated that the disclosed systems and methods are not limited to property interests in a parcel of land but rather can be realized for a multitude of documented interests and statuses which change and shift over time.

Figure 2:
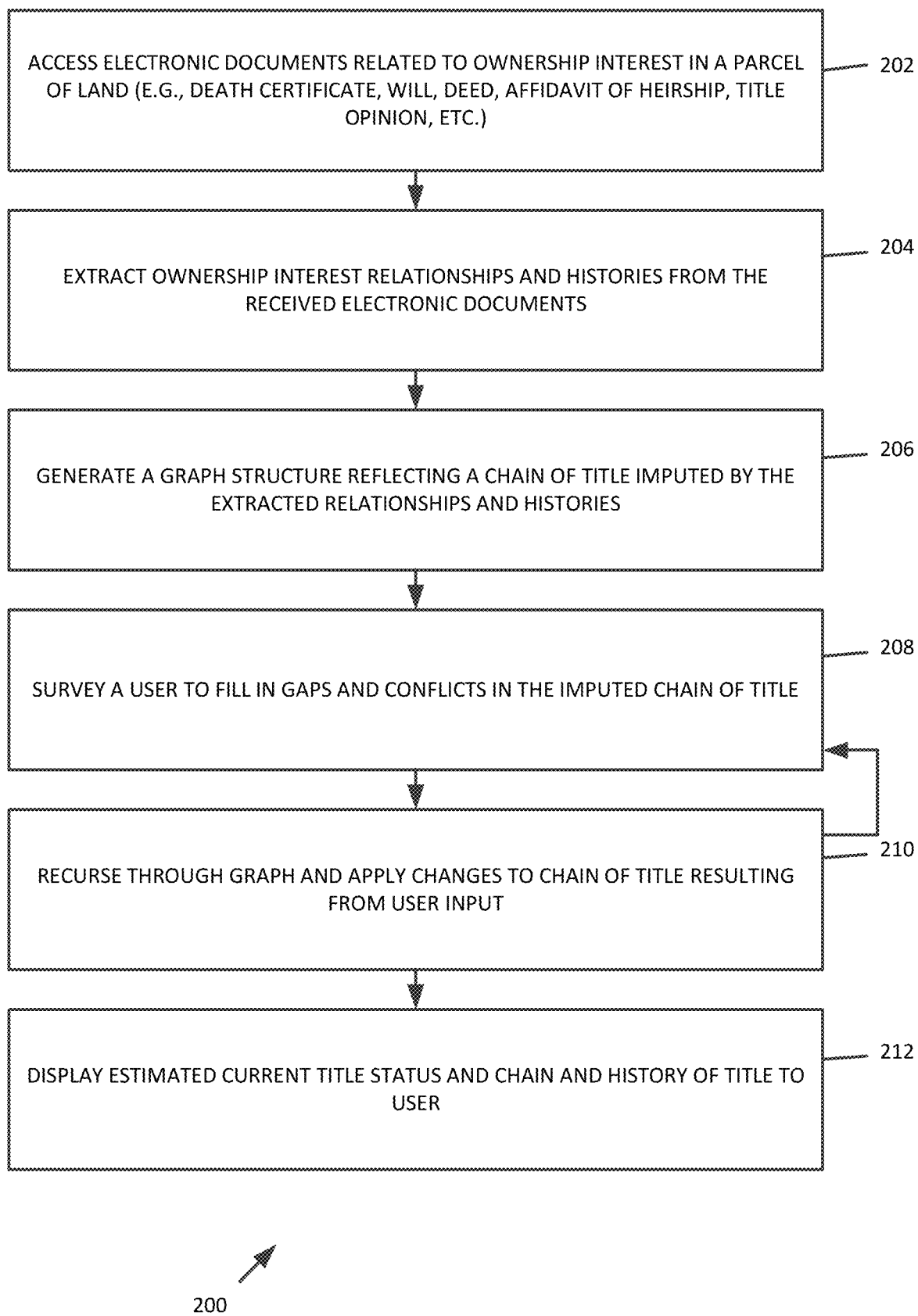
FIG. 2 is a flowchart of a method for a natural language processing system for documents, such as title documents and other documents related to property interests, in accordance with various embodiments of the subject technology.

FIG. 1 depicts one example of a system 100 for processing an unordered collection of raw image documents having to do with title to a property. In some instances, paper documents are first electronically processed (e.g., scanned) and stored in an electronic memory from which the system may access the image documents. The system 100 can generate an interactive graph (depicted in FIG. 4 and discussed below) that is accessible through some form of computing device 114 and allows a user to review and interact with all of the image documents for a chain of title to a property. FIG. 2 depicts a method 200 for generating a collection of interconnected data objects with links to each other which may be manually updated by the user.

Referring to FIGS. 1 and 2, the method begins with accessing various possible image documents related to ownership interest in a property (e.g., a parcel of land) (operation 202). As noted above, original documents may be in various possible forms. Prior to accessing any image documents, any non-digital documents are processed into images. Hence, the system 100 may ingest title documents 101 for a property, which documents may include unordered and heterogeneous documents 101 retrieved from a data store 102 such as a database or repository, etc. For example, a handwritten last will and testament may be provided as a scanned image of nonstandard sized paper while an earlier dated deed may be provided after the handwritten last will and testament and as a scanned image of a typed and standard sized document. In some embodiments, title documents 101 may be stored in multiple databases such as, for example, a distributed file system and the like. In some embodiments, a third-party application interface ("API") may provide pre-structured documents or document images. For example, a registry of deeds may provide an API for retrieval of structured data objects representing deed information. The ingested documents may then be processed into an ordered sequence of data structures to generate a navigable interface at a user terminal 114 so that, for example, a user can review an ownership history of a property to determine a current title status or identify gaps in title history and the like.

The system may also access one or more title opinions 103 in a data store 104 as part of operation 202. Title opinions are prevalent in the oil and gas industry, and may involve one or more of drilling title opinions, mortgage opinions, acquisition opinions, division order title opinions and the like. Text of a title opinion 103 may be processed by a machine learning model trained on oil and gas industry ontologies to identify a semantic content of the title opinion text and a positive or negative treatment to (supporting or contradicting) an estimation of rights and title by the system (discussed below).

Documents may be received as image files, text files, or structured data (e.g., a JSON object). When a document is received in an image format, such as a PDF or TIFF, the chain of title mapper 106 may apply optical character recognition ("OCR") software to the document in order to convert the image file into a text format for further processing. The OCR technology can be included as part of the chain of title mapper 106 or may be a third-party service accessed through an API. Once the documents have been converted into text with the OCR software, the chain of title mapper may then receive them as text data. In some embodiments, data objects containing the text may be stored in a short-term memory, such as random access memory ("RAM"), for immediate access by the chain of title mapper 106. In some other embodiments, the data objects having the text may be stored in long-term memory, such as a database or the like, to run the chain of title mapper 106 on the text data again without having to repeatedly run the OCR software.

The chain of title mapper 106 is a document processing system, running on a hardware processor, that can apply trained models and rule-based logic to natural language documents in order to extract ownership interests, changes in ownership interests, and event ordering (e.g., histories or chain of title) from the accessed title documents 102 (operation 204). The models may be trained on ontologies associated with time values and rights or changes in rights so that words need not exactly match a specific key word or phrase for the chain of title mapper 106 to recognize a reference to a particular date or that particular interest in the property has been conveyed to a party in a particular way.

For example, the chain of title mapper 106 may access multiple title documents 101, which undergo a conversion into a text format via OCR processing and the like. A PDF of a land deed describing a conveyance of all rights and title to Alan Greenacre dated Aug. 8, 2001 may undergo an OCR processing in order for chain of title mapper 106 to receive and process a text version of the document. The chain of title mapper 106 may also access a handwritten last will and testament, converted into a text format, of Alan Greenacre executed in 2002 and designating that his daughter, Beatrice Greenacre, and his son, Charles Greenacre, each inherit a 50% interest in each of his real estate properties, which would include the property deeded on Aug. 8, 2001. The chain of title mapper 106 may further receive, from another data store such as via a third-party API of some sort and as a data object containing text for processing, a death certificate for Alan Greenacre dated Jul. 9, 2005. In one example, any document associated with a property is converted into a text format (or other format appropriate for processing by a trained model). So, for example, a paper document may be scanned into an image, and may go through OCR to convert it into a text format. An image document may only need OCR, and some electronic documents may already be in text format.

In some examples, computing system 105 includes various other supporting software for performing operations such as OCR processing of accessed documents and the like. Prior to the chain of title mapper 106 executing operation 204 on title documents 101 accessed at data store 102 and/or title opinions 103 accessed at data store 104, computing system 105 may perform OCR operations on, for example, the deed PDF (e.g., a title document 101 stored in data store 102) to convert the content into a text format. In many cases, any documents being processed by the mapper 106 will be preprocessed through OCR or the like, and will be accessed from a database or other memory structure in communication with computing system 105 running the chain of title mapper 106. The chain of title mapper 106 applies a trained model to the text of each document. In some examples, the trained model may be stored in a model storage 107, which may be a data base or the like communicatively coupled to computing system 105 (e.g., within a shared system, over a local area network (LAN), over the Internet, via virtual network, etc.). Where trained model storage 107 stores multiple trained models for specialized use (e.g., a "deed" model, a "last will and testament" model, etc.), a model selection process can be performed by computing system 105 or by model storage 107 based on information provided to model storage 107 by computing system 105.

Referring again to the document examples introduced above, the trained model can recognize that the language of the text of any of the documents (e.g., the land deed to Alan Greenacre) refers to an ownership interest and will identify that all right and title in the land was deeded to Alan Greenacre. In particular, and as further discussed below, the chain of title mapper 106 may generate data objects corresponding to each document and also corresponding to a particular property right or rights (e.g., multiple interested parties, multiple rights to a singular party, etc.) to a parcel of land. Additionally, based on semantic content of the processed documents, the chain of title mapper 106 may produce rules defining interactions between certain data objects (e.g., conveyances, a death certificate in combination with a last will and testament, etc.), as also further discussed below.

Furthermore, the trained model may identify one or more dates in the deed (e.g., a signature date) of Aug. 8, 2001 and recognize that as a start time for the associated property interest. Furthermore, the chain of title mapper 106 can identify the third document as a death certificate dated Jul. 9, 2005. A rule may be enforced by the chain of title mapper 106 that a party's interests conclude at a death date and, recognizing that the death certificate is associated with Alan Greenacre, the chain of title mapper 106 can assign an ending date to the ownership interest of Alan Greenacre. In some embodiments, a death certificate may enforce a rule that all decedent rights conclude at the time of death. Where probate court documents or a last will and testament are included, the title mapper 106 may recognize a new property interest arising. In this way, the title mapper 106 may generate a composite rule from the semantic content of, for example, a last will and testament by determining a rule-based logic to apply based on the semantic content of a document.

Further, because the chain of title mapper 106 does not receive any conveyance documents with dates associated to a time between Aug. 8, 2001 and Jul. 9, 2005, the ownership interest of Alan Greenacre may be associated with the entire span of time, thereby extracting a complete interest in all rights and title to Alan Greenacre in the deeded land extending from Aug. 8, 2001 to Jul. 9, 2005.

Additionally, the chain of title mapper 106 may extract a first one-half ownership interest in the deeded land to Beatrice Greenacre and a second one-half ownership interest in the deeded land to Charles Greenacre by applying trained models to the handwritten last will and testament, which may also be treated by OCR software for the production of text data before being processed further by the chain of title mapper 106. Because the interests are extracted from a last will and testament associated with a party associated with a death certificate dated to Jul. 9, 2005, both interests may extend from Jul. 9, 2005 to current time using a rule-based logic.

Figure 3:
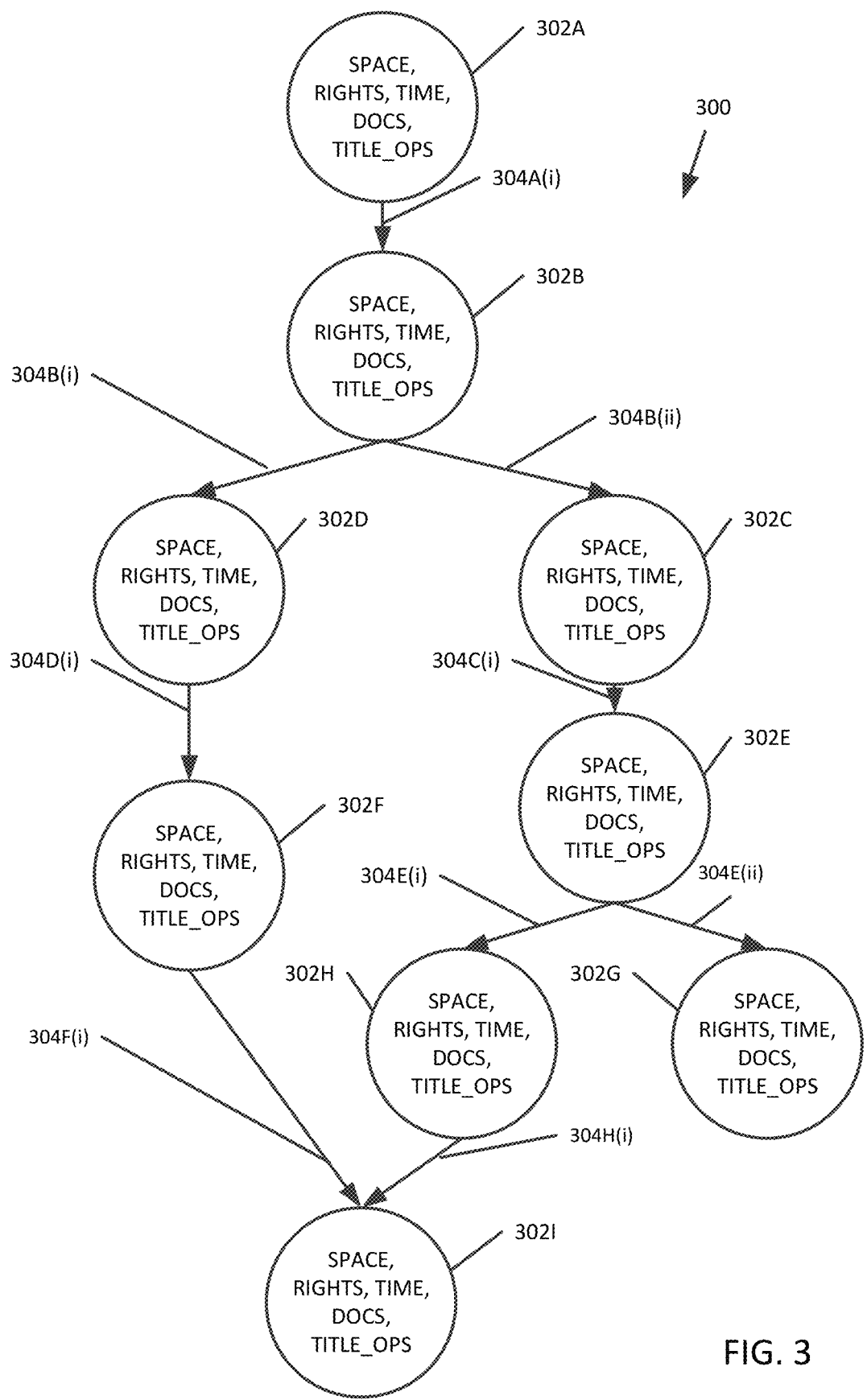
FIG. 3 is an illustration of a representation of a back-end graph data model in accordance with various embodiments of the subject technology.

The chain of title mapper 106 can generate a graph data model providing ordered title objects 112 which reflect the ownership history and chain of title imputed by the extracted data above (operation 206). FIG. 3 depicts an embodiment of the generated graph data model 300. As part of the graph, the system generates nodes 302A-I that are data objects holding values for (a) "space" providing the physical location and bounds of a property, (b) "rights" describing the parties having interests in the property and what those interests are, (c) "time" providing a start and end date of the combination of interests, (d) "docs" providing records and documents evidencing the space, rights, and time fields of the node described above, and (e) "title_ops" providing any supporting title opinions which may increase the confidence the system has in the estimated ownership interests in the property (further discussed below). The system analyzes the documents and generates the fields for each node, as well as the ordered relationships between the nodes.

Edges 304A-H extend between nodes 302A-I and include a directionality component (depicted here by arrows), which denotes a recency of the nodes (a node being pointed at is a more recent state of title than a node that is being pointing away from). In other words, nodes which are downstream, or pointed at, are more recent than preceding nodes. Furthermore, a downstream node may also arise out of a connected upstream node (e.g., indicating a conveyance).

In some embodiments, the nodes 302A-I may also contain two additional fields holding out-edges and in-edges respectively. The out-edges field provides data level linkage between a node and those edges pointing away from the node. The in-edges field provides a data level linkage between a node and those edges pointing at the node. In some embodiments, the edges may be realized as data structures containing a field holding an origin node and a field holding a destination node.

The graph data model 300 may be traversed backwards or forwards by viewing a node's out-edges or in-edges and then viewing the respective edges' origin fields or destination fields, depending on the direction of traversal (to traverse backwards through the graph, one would move to a node's in-edges' origin nodes). The graph data model 300 may be implemented as a python dictionary, a JSON array, a linked list, or any other of a variety of ways as will be apparent to a person having ordinary skill in the art.

Operation 206 may create one or more such nodes as described above and populate the respective fields to produce the structure of ordered title objects 112. Revisiting the Greenacre family example, the chain of title mapper 106 may generate a first node containing the values (a) "space," denoting the parcel of land in the original deed to Alan Greenacre, (b) "rights," denoting a 100% ownership interest possessed by Alan Greenacre, (c) "time," denoting the time range Aug. 8, 2001 to Jul. 9, 2005, (d) "docs," providing the Aug. 8, 2001 deed and the Jul. 9, 2005 death certificate, and (e) "title_ops," which is empty as no title opinion was involved in generating the node. An edge may extend out of the first node and point to a second, connected node. Certain documents may denote an edge because they are intrinsically related to a change in rights and interests in a property. For example, a death certificate is intrinsically related to the conclusion of a property interest (and is often related to the creation of one or more new property interests) and so therefore is often associated with an edge.

The second node may contain the values (a) "space," again denoting the parcel of land in the original deed to Alan Greenacre, (b) "rights," denoting a 50% ownership interest possessed by Beatrice Greenacre and a 50% ownership interest possessed by Charles Greenacre, (c) "time," denoting a starting time range of Jul. 9, 2005 and the range extending to current, (d) "docs," providing the last will and testament of Alan Greenacre executed in 2002 and the Jul. 9, 2005 death certificate, and (e) "title_ops," empty here as in the first node because no title opinions have been submitted.

Having generated a graph data model 300, chain of title mapper 106 may then identify gaps 111 or conflicts in title and provide a user survey 108 for the user to provide either a manual linkage or additional documents, or to choose a correct node where a conflict is identified (operation 208). For example, a first property interest may be extracted from the scanned in documents that causes the system to generate a node extending from 1975 to 1985 and a second property interest may be extracted that causes the system to generate a node extending from 1986 to 2001, but no interests are extracted that range from 1985 to 1986, resulting in a gap in title coverage. In some embodiments, a user may be able to manually fill this gap by drawing an edge between the two nodes. In some embodiments, the system may automatically recognize the gap and notify the user with an input prompt through which the user may enter relevant gap filling information such as new documents or by providing fillable fields within the prompt (e.g., grantor and grantee information, time of conveyance, and the like).

Nodes 302H and 302G may conflict with each other by including incompatible "time" and "rights" values. For example, node 302H may denote a complete interest in all rights and title by a party of the same parcel of land described in node 302G, which may also denote a complete interest in all rights and title by a different party. Nodes 302H and 302G may further include overlapping "time" values, resulting in two different parties each purportedly having complete ownership of the same parcel of land at the same time. In other words, the system may detect a conflict when multiple nodes purport to contain incompatible rights. Such conflicts can arise in various situations such as, for example, when a property has been fraudulently sold multiple times or when a sold property has been incorrectly devised during probate proceedings. In such cases, a user may be asked via the user survey 108 to resolve the conflict by choosing an authoritative node.

Nodes may be connected to conflicted nodes by in-edges. For example, a conflicted node may have one or more child nodes. In such a situation, a resolution of the conflicting nodes (e.g., by manually determining a correct or authoritative node) may cause child nodes' values to change. Resolving conflicts may also cause child nodes to enter into or be removed from conflicts themselves. These changes may be accomplished by recursively iterating through the graph (e.g., updating the child nodes of each node that is updated, including the updated child nodes) and applying responsive changes to conflicts and values reflective of the user input from the user survey 108 (operation 210).

In situations where operation 210 causes new conflicts, such conflicts may be resolved by repeating operation 208 and providing a follow up user survey 108. This sequence can loop multiple times when resolution of one conflict triggers new conflicts among child nodes or grandchild nodes, etc.

During and after operations 208 and 210, an estimated current title status and chain and history of title may be displayed to a user as an interactive graph interface 109 via the user terminal 114 (operation 212). In some embodiments, the user terminal 114 may be a computing device 110 and can display the interface 400 (depicted in FIG. 4 and discussed below) to the user. In some other embodiments, the user terminal 114 may be a mobile computing device such as a cell phone, tablet computer, and similar devices. In some embodiments, the survey 108 may be integrated into the interactive graph interface 109 by allowing the user to create or cut edges between nodes. In some embodiments, a user can cut an edge by right clicking on it with a mouse cursor and selecting "cut" from a context menu or a toolbar presented to the user through the graphical user interface (GUI). In some embodiments, a user can create an edge between two nodes by right clicking a node and selecting "create edge" from a context menu or a toolbar presented to the user through the GUI. In some embodiments, a directionality may be automatically calculated by the system using a rule-based logic that a node with a more recent date must always be a receiving node for an edge and the directionality may be presented to the user by overlaying an arrow on a connecting edge.

FIG. 3 depicts an embodiment of the graph structure 300 generated by operation 206 and refined by operations 208 and 210, as discussed above. Each node has a unique "time" value and unique "space" or "rights" values. Edges 304A-H each denote a change in these values between two nodes. Thus, the nodes 302A-I reflect a state of ownership interests and demarcation of land, while the edges 304A-H reflect changes in ownership interests and/or demarcation of land.

In some embodiments, a most recent, or latest, node, node 302I as depicted here, may contain only in-edges (will possess no child nodes—sometimes also called a leaf). The latest, or leaf, nodes may provide the most up to date title status of a respective parcel of land. Where there are multiple leaf nodes, either a conflict exists or multiple distinct land parcels are described.

An earliest node 302A is generated from the earliest discernible ownership interests and contains only out-edges (e.g., the node is not a child to any other node—sometimes also called a root). Multiple earliest nodes may be generated (e.g., multiple roots). For example, where a chain of title for a final parcel of land can be traced back to multiple, originally independent constituent parcels of land, multiple roots can be generated.

As depicted in FIG. 3, a node 302B may have multiple child nodes 302C and 302D. In some embodiments, child nodes will conflict, as in the above discussed case involving nodes 302G and 302H. In some embodiments, child nodes may designate a larger parcel of land having split off into two smaller, independent parcels of land as is the case with node 302B and child nodes 302C and 302D.

Figure 4:
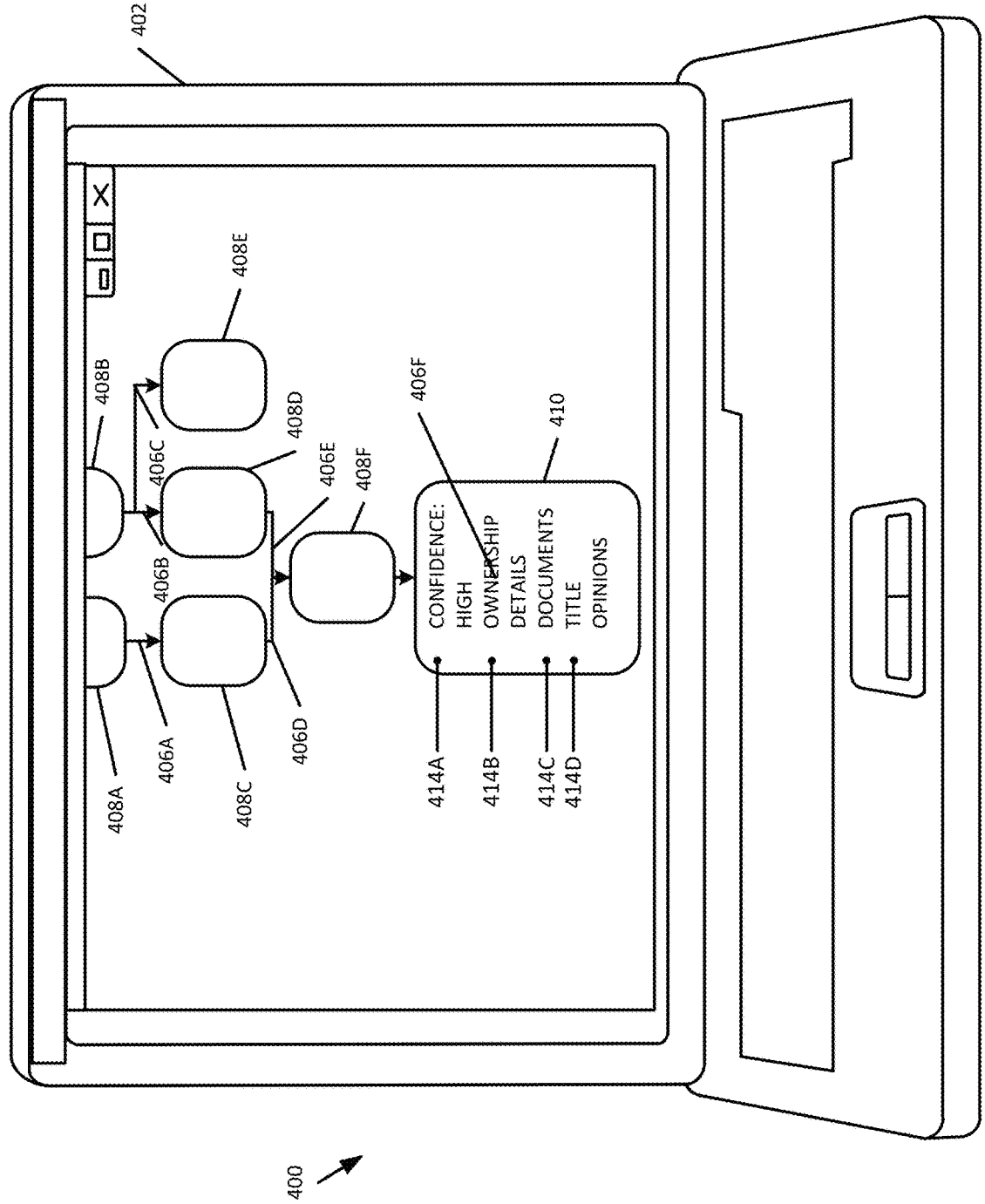
FIG. 4 is an illustration of a user interface displaying a navigable chain of title, in accordance with various embodiments of the subject technology.

FIG. 4 depicts an example of a user interface 400 which may be received at a user terminal 402 as an interactive graph interface 109. User terminal 402 may be a stationary computer, laptop computer, tablet device, mobile phone, or other computing device. An interactive directional graph 412 is rendered to a user and may be based on stored data such as the graph data model 300.

Nodes 408A-E and node 410 are graphical representations of the data model structure discussed above and depicted in one embodiment as nodes 302A-I. Here, nodes 408A-F are rendered smaller than node 410 because they are unopened or minimized. In some embodiments, the minimized nodes 408A-F can display limited summary data and may be clicked on in order to be expanded for additional details in the fashion of node 410. The node 410, being a leaf node, provides the most up to date title information of a parcel of land.

Node 410 includes four fields 414A-D: "Confidence," "Ownership Details," "Documents," and "Title Opinions," respectively. In some embodiments, each of field can be selected by a user to provide more detailed information. The "Confidence" field 414A provides a level of confidence that the system has in the displayed title status. The "Confidence" field 414A can be one of four values: "highest," "high," "medium," and "low." The "highest" confidence level denotes that all supporting title documents are present, are validated, and a corresponding title opinion is also present. The "high" confidence level denotes that all supporting documents are present and validated, however, no corresponding title opinion is present. The "medium" confidence level denotes that no documents are present or the documents are incomplete and there is a corresponding title opinion. The "low" confidence level denotes that the documents are incomplete and there is no corresponding title opinion present. As depicted, "Confidence" field 414A displays a "high" confidence level, denoting that all documents are provided and validated but there is no corresponding title opinion.

In some embodiments, a user can select the "Confidence" field 414A and an explanation of the particular level assigned may be provided in a popup window (not depicted). Selecting the "Ownership Details" field 414B may cause the system to generate a popup window describing the various interests in the parcel of land tracked at the respective node. Selecting the "Documents" field 414C may cause the system to generate a popup window listing the documents supporting the respective node's title estimation. In some embodiments, the list may include hyperlinks to an image of each document. In some other embodiments, the list may simply be a text list of the document titles and types (e.g., last will and testament, etc.). Selecting the "Title Opinions" field 414D may cause the system to generate a popup window containing an image of the respective title opinion. In some embodiments, the popup window may contain a list of hyperlinks to one or more respective title opinions, which may each be selected to generate a second popup window providing an image of the respective title opinion.

Edges 406A-F interconnect the nodes 408A-F and node 410. Each edge of edges 406A-F connects one node of nodes 408A-F and 410 to one other node of nodes 408A-F and 410. For example, edge 406F connects node 408F to node 410, edge 406E connects node 408D to node 408F, edge 406 D connects node 408C to node 408F, etc. In some embodiments, edges 406A-F can be color coded to represent varying degrees of confidence in the underlying alleged change of title status. A red edge, for example, may denote a low degree of confidence in the change. In some embodiments, red may also indicate that the nodes receiving the edge are in conflict. Generally, where an red edge is farther up the graph, the nodes and the edges depending from it will also be marked red, reflecting a potentially flawed chain of title. Here, edges 406B and 406C are red (color not depicted) as the parcel was sold twice by the same seller, resulting in nodes 408D and 408E describing different ownership interests to the same property over the same period of time. As a result, edges 406E and 406F are also marked red, denoting preceding chain of title issues.

As discussed above, conflicted nodes and edges may be resolved by a user through a survey 108, which may be integrated directly into the interface 400 displayed to the user. As depicted in FIG. 4, a user can select an edge to assign it authority and thereby resolve any conflicts with other edges. The user may select edge 406B to give it authority, and thus no longer marked in red, and the graph may recursively update according to operation 210, causing edges 406E and 406D to also no longer be marked red.

Figure 5:
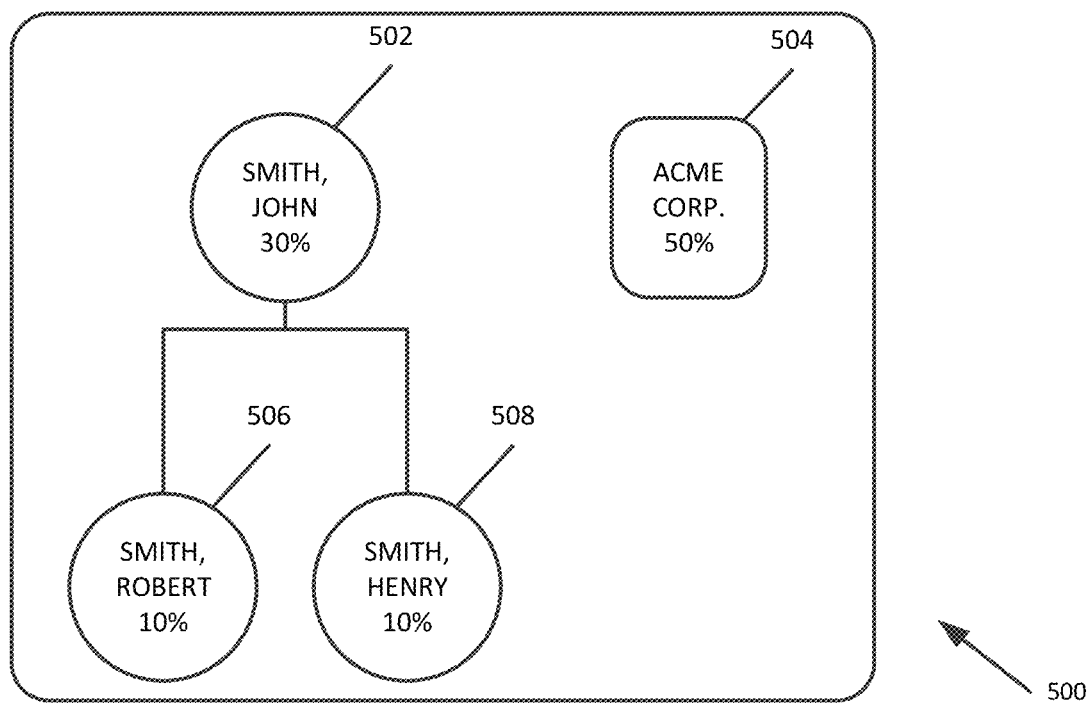
FIG. 5 is an illustration of a current ownership status of a property, in accordance with various embodiments of the subject technology.

FIG. 5 depicts an embodiment of an ownership interest chart 500. The ownership interest chart 500 may be provided as part of the interface 400 and generated in a popup window when a user selects the "Ownership Details" field 414B of an opened node as discussed above. The ownership chart 500 provides a graphical representation of ownership interests and connections between interested parties. Here, ownership is divided between four parties. John Smith 502 possesses a 30% ownership interest, Acme Corp. 504 possesses a 50% ownership interest, and Robert Smith 506 and Henry Smith 508 each respectively possess 10% ownership interests. Robert Smith 506 and Henry Smith 508 both depend from John Smith 502, denoting the parties are related.

Figure 6:
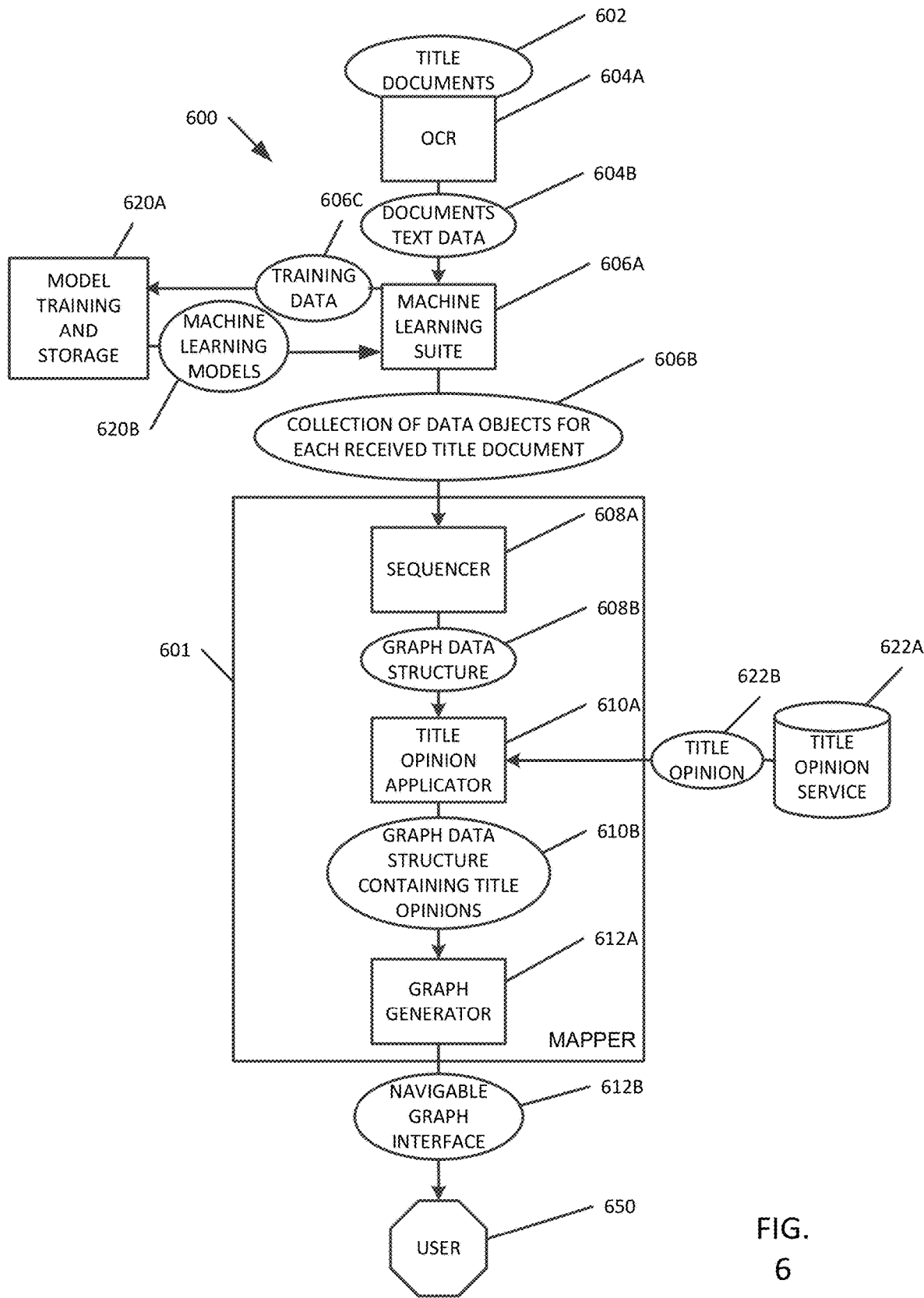
FIG. 6 is a system diagram for a natural language processing system for documents, such as title document and other documents related to property interests, in accordance with various embodiments of the subject technology.

FIG. 6 depicts one specific example of a processing architecture and associated data flows associated with a method for generating an interactive, navigable graph interface for a chain and history of title for a property, based on an unorganized collection of disparate documents associated with the property. An OCR module 604A first accesses title and other documents related to a property right 602. The documents 602 can be stored document images, such as would be generated by scanning paper records, or may be passed to or otherwise loaded in a memory directly as digital files containing text, or documents retrieved through API calls to third party data services (e.g., government records providers, etc.). The documents 602 may include death certificates, last will and testament documents, deeds, probate documents, affidavits of heirship, and other documents related to property interests.

The OCR module 604A generates and stores a text file associated with each of the documents (604B). In some cases, text files may be accessed or otherwise directly obtained eliminated any need for further OCR. The text files may then be made available to a machine learning suite 606A. The machine learning suite 606A processes (e.g., ingests into a trained model, etc.) documents text 604B and generates structured data 606B, which is passed to a mapper 601, such as, for example, chain of title mapper 106. Mapper 601 may include multiple components and be a microservices architecture, a monolith architecture, or some combination of the two or other architectures.

Nevertheless, a sequencer 608A within mapper 601 may first receive structured data 606B in order to generate a structured composition of multiple structured data 606B such as, for example, a graph structure. The machine learning suite 606A can use machine learning models such as Support Vector Machines ("SVMs") or neural networks, a rule-based logic, or a mixture of the aforementioned methodologies to identify relevant title information from the documents text 604B and convert that information into structured data 606B for downstream processing. Information identified by the machine learning suite 606A may include, as a non-limiting example, the following: grantor name, grantee name, effective date, granted right, interest percentage, decedent name, date of decedent death, county, residence, land description, effective date, participating parties in an estate, heir name, and affidavit date. The data objects 606B each map to a particular document and may be composed of JSON objects, python dictionaries, XML, YAML, or other structured data formats. For example, one embodiment of a data object mapped to the example deed discussed granting Alan Greenacre ownership of a parcel of land is provided by an example JSON object in Table 1 below.

TABLE 1

Example JSON object mapping of a deed ("Example Mapping")

{"docID":"00001", "docType":"deed", "grantor":"UNKNOWN", "grantee":"Alan Greenacre", "date":"2001-08-28", "rights":{"type":"ownership", "proportion":1.0}}

The Example Mapping includes a docID value which identifies the original unstructured document, from which the node was generated and also providing information so that it may be retrieved and viewed. In some instances, the docID may also be a hyperlink to the OCR document stored in memory. Where the information is retrieved through an API or other source providing already structured data, docID may store a null value or may provide a link or pointer to the original source if possible. A docType value which denotes the type of document and is here assigned a value of "deed," though the field could take any value denoting a particular document type such as "lease," "probate decision," "will," etc. In some embodiments, the docType field will indicate what other fields may be contained in the data object. For example, a "will" docType may indicate that the object does not contain "grantor" and "grantee" fields, but instead contains "devisor," and "devisee" fields. The docType field may provide further information regarding the document format such as that document has been retrieved as structured information through an API. In some embodiments, a trained model may identify a docType based on the text contained in the document. In other embodiments, a rule-based logic may identify key words and phrases within the text, causing the system to identify the docType in response to identifying the key words and phrases (e.g., the words "deed to" followed by an address of a real property may cause the system to identify the docType as a deed). In some embodiments, a mixture of a trained model and rule-based logic may be used. For example, certain identified key phrases may cause the system to apply certain trained models to the text. Furthermore, once a docType has been identified, forking rule-based logic and/or trained model application may allow the system to identify the other fields such as "grantee," "devisee," and the like. A "date" field provides a starting date preserved as a formatted string and a "rights" field holds a nested data object describing the rights types and proportions described in the deed. Here, only an ownership right is provided and at a proportion of 1.0, denoting a complete interest in all rights and title.

In some embodiments, the machine learning suite 606A may apply trained machine learning models 620B to the documents text data 604B. The machine learning suite 606A can receive the machine learning models 620B from a model training and storage 620A. The machine learning models 620B can be SVMs, naïve Bayes classifiers, neural networks, k-means clustering, and the like.

In some embodiments, the machine learning suite 606A can provide training data 606C to the model training and storage 620A. The machine learning suite 606A may extract the training data 606C from the documents text data 604B. The model training and storage 620A can continuously train and update the machine learning models 620B using the training data 606C. In some embodiments, a human may be used to review the machine learning models 620B output and verify that the output (a collection of data objects for each received title document (606B)) is correct. In some embodiments, one or more humans may perform review of training data 606C to provide correctly labeled data against which model training and storage 620A can train and validate the machine learning models 620B.

The sequencer 608A determines a chronological ordering of the structured data 606B by applying machine learning models, rule-based logic, or a mixture of the two to the structured data 606B. The sequencer 608A provides a graph data structure 608B to a title opinion applicator 610A. The sequencer 608A may use date information in combination with grantor and grantee related information to construct a representative ordering of the content produced by the machine learning suite 606A. The sequencer 608A can combine related data into a single data object containing fields describing the parcel of land, the rights described, the span of time covered, and supporting documents (e.g., the docID field of the Example Mapping discussed above). The sequencer 608A may further generate edges between the generated data objects denoting a progression of interests in a parcel of land. The graph data structure 608B can be structured similarly to the graph data model 300 discussed above. Unlike the graph data model 300, the graph data structure 608B does not contain title opinion information, which is provided downstream by the title opinion applicator 610A.

The title opinion applicator 610A receives the graph data structure 608B from the sequencer 608A and inserts a relevant title opinion 622B into each relevant node in the graph data structure 608B for which a title opinion is available. Tile opinion service 622A provides the title opinion 622B to the title opinion applicator 610A and may be a local service and/or database, a third-party commercial service, or an API. In some embodiments, the title opinion service 622A can be a local database of title opinions and may contain structured title opinions. In some embodiments, the title opinion service 622A may identify title opinion documents among the title documents 602 and store them for downstream application after the system 600 receives the title documents 602.

The title opinion applicator 610A matches nodes with title opinions 622B by processing the language of each title opinion 622B by using machine learning techniques, rule-based logic, or some combination of the two and then traversing through the graph data structure 608B until a node matching the content of the title opinion is found. For example, a title opinion 622B may be dated to a time within a particular span of time and may include descriptions of a particular parcel of land, which can be used to identify the relevant node to which the title opinion 622B may be linked. Furthermore, a trained model and/or rule-based logic may be applied to the text of the title opinion to determine whether the title opinion coincides with or contradicts the interests described by the fields of the node. The level of concurrence between a title opinion and the fields of a node may be used to determine a level of confidence the system has in its estimated interests (further discussed below). As a result, the title opinion applicator 610A generates a graph data structure containing title opinions (610B). The resulting data structure may be the graph data model 300 depicted by FIG. 3 and discussed above.

The title opinion applicator 610A provides the graph data structure containing title opinions (610B) to a graph generator 612A which may generate a navigable graph interface 612B. The graph generator 612A may contain mappings for the nodes and edges of the graph data structure containing title opinions (610B). A mapping may provide particular graphical elements based on the fields contained in a node or edge. Further, the graph generator 612A may determine the confidence level 414A of a node based on the contents contained within the node. For example, where there is a title opinion held by the node, the graph generator will assign a high confidence level 414A to that node. The graph generator 612A can also identify conflicts as discussed above and apply a red graphical element to the edges and/or nodes identified as conflicted.

The graph generator 612A provides a navigable graph interface 612B to a user 650. One embodiment of the navigable graph interface 612B is depicted by FIG. 4 and discussed above. The user 650 may receive the navigable graph interface 612B through a variety of devices such as, without limitation, a desktop computer, mobile phone or device, laptop computer, and other devices which will be apparent to a person of ordinary skill in the art.

It is to be understood that, in some embodiments, the graph data structure containing title opinions 610B may be passed to other utilities simultaneous to, or alternatively to, the graph generator 612A. For example, a blockchain constructor may receive the graph data structure containing title opinions 610B, allowing the title documents 602 to be converted into a rights management blockchain. Another example is a graph database which may aggregate graph data structures containing title opinions 610B from multiple sets of title documents 602 to construct a universal title mapping.

Figure 7:
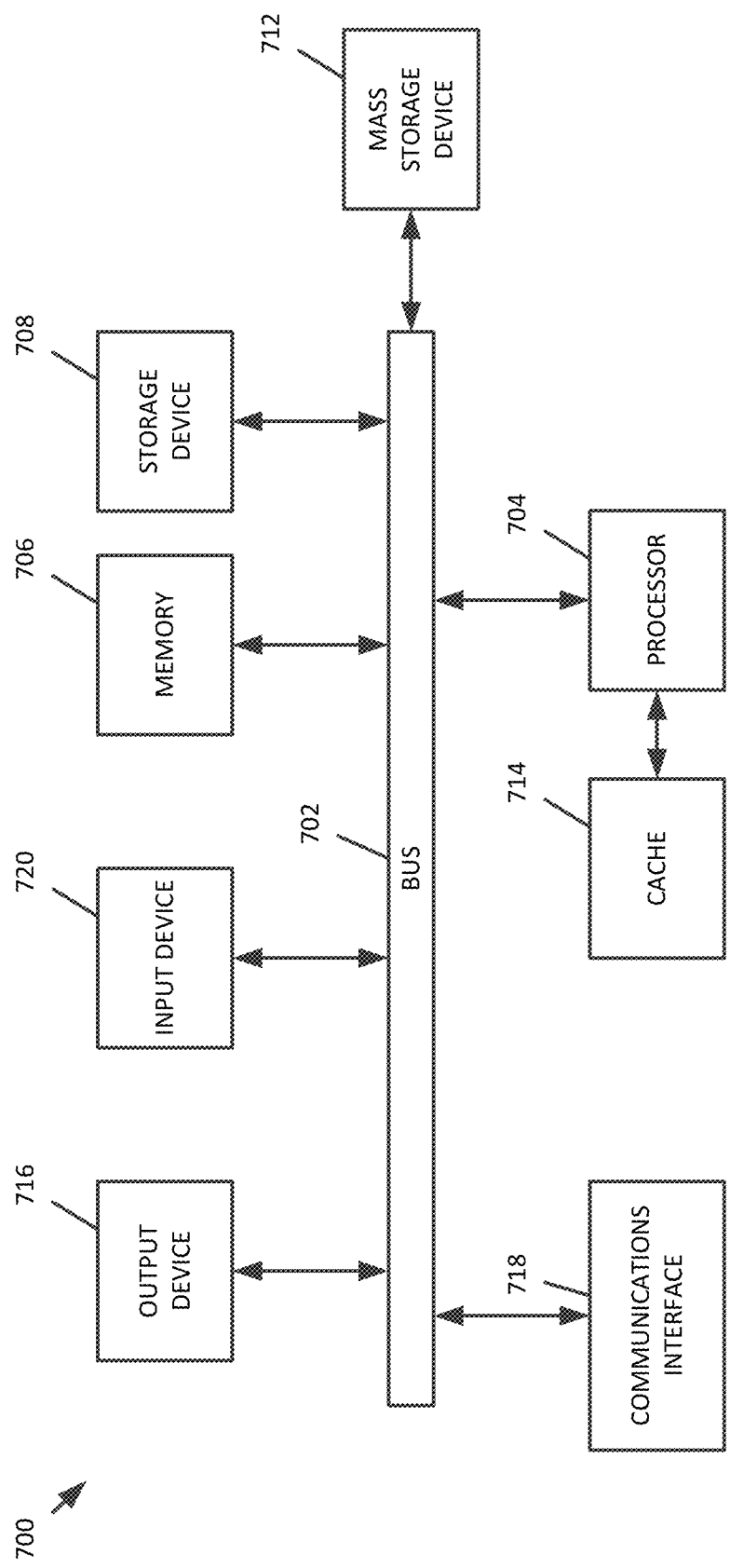
FIG. 7 is a system diagram of an example computing system that may implement various systems and methods discussed herein, in accordance with various embodiments of the subject technology.

FIG. 7 is an example computing system 700 that may implement various systems and methods discussed herein. The computer system 700 includes one or more computing components in communication via a bus 702. In one implementation, the computing system 700 includes one or more processors 704. The processor 704 can include one or more internal levels of cache (not depicted) and a bus controller or bus interface unit to direct interaction with the bus 702. The processor 704 can include the chain of title mapper 106 and specifically implements the various methods discussed herein. Main memory 706 may include one or more memory cards and a control circuit (not depicted), or other forms of removable memory, and may store various software applications including computer executable instructions, that when run on the processor 704, implement the methods and systems set out herein. Other forms of memory, such as a storage device 708 and a mass storage device 712, may also be included and accessible, by the processor (or processors) 704 via the bus 702. The storage device 708 and mass storage device 712 can each contain any or all of the chain of title mapper 106, title documents 102, title opinions 104, machine learning suite 606A, sequencer 608A, title opinion applicator 610A, title opinion service 622A, model training and storage 620A, and graph generator 612A.

The computer system 700 can further include a communications interface 718 by way of which the computer system 700 can connect to networks and receive data useful in executing the methods and system set out herein as well as transmitting information to other devices. The computer system 700 can include an output device 876 by which information is displayed, such as the display 402. The computer system 700 can also include an input device 720 by which information, such as title documents 602, is input. Input device 720 can be a scanner, keyboard, and/or other input devices as will be apparent to a person of ordinary skill in the art. The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   accessing, by a processor, one or more electronic documents;
   providing, by the processor, text of the electronic documents to a trained model to generate a first data object and a second data object, each data object comprising a property right, a length of time, and a location;
   generating, by the processor, a relationship between the first data object and the second data object, the relationship associated with a change in property rights associated with the location; and
   generating, by the processor and based on the generated change in property rights associated with the location, a confidence level associated with a current property rights associated with the location.

2. The method of claim 1, further comprising generating, by the processor, text of the electronic documents by executing an optical character recognition (OCR) process on the one or more electronic documents.

3. The method of claim 2 further comprising:
   generating, by the processor, a description of current property rights to the location based on one of first data object, the second data object, or the relationship, and the description comprising a predicted property right interest in the location;
   generating, by the processor, a navigable interface comprising one or more nodes connected by edges, each node associated with a data object of the one or more data objects and each edge associated with a transition from a first data object to a second data object, the transition associated with a change in property rights to a location; and
   wherein the edges are color coded according to a confidence level associated with one of a respective first data object or a respective second data object, the respective data objects associated with one of a respective first node connected to a respective edge or a respective second node connected to the respective edge.

4. The method of claim 2 further comprising:
   generating, by the processor, a description of current property rights to the location based on one of first data object, the second data object, or the relationship, and the description comprising a predicted property right interest in the location;
   identifying, by the processor, a gap in property rights, the gap in property rights associated with a span of time between two nodes in which no property rights for the location are known; and
   generating, by the processor, a prompt to amend the gap by providing an inputted edge between the two nodes.

5. The method of claim 1, further comprising:
   generating, by the processor, a description of current property rights to the location based on one of first data object, the second data object, or the relationship, and the description comprising a predicted property right interest in the location;
   providing, by the processor, the text of the electronic documents to a second trained model to generate one or more rules; and
   applying, by the processor, the one or more rules to the one or more data objects to produce one or more modified data objects;
   wherein the description of the current property rights to the location is based on the one or more modified data objects.

6. The method claim 5, wherein the rules comprise a derived relationship between the first data object and the second data object, the derived relationship generated by one of a trained rules model or a rules-based process.

7. The method of claim 1, further comprising:
   generating, by the processor, a description of current property rights to the location based on one of the first data object, the second data object, or the relationship, the description comprising a predicted property right interest in the location.

8. The method of claim 7, wherein the confidence level comprises a likelihood of a node or a relationship comprising correct information, and wherein the confidence level is based on a title opinion processed by a trained title opinion model.

9. The method of claim 1, further comprising generating, by the processor, a navigable interface comprising one or more nodes connected by edges, each node associated with a data object of the one or more data objects and each edge associated with a transition from a first data object to a second data object, the transition associated with a change in property rights to a location.

10. The method of claim 9, wherein the edges are color coded according to a confidence level associated with one of a respective first data object or a respective second data object, the respective data objects associated with one of a respective first node connected to a respective edge or a respective second node connected to the respective edge.

11. The method of claim 1, wherein the property rights comprises one of an ownership interest, mineral rights, subsurface rights, or surface rights.

12. The method of claim 1, further comprising:
   identifying, by the processor, a gap in property rights, the gap in property rights associated with a span of time between two nodes in which no property rights for the location are known; and
   generating, by the processor, a prompt to amend the gap by providing an inputted edge between the two nodes.

13. The method of claim 1, further comprising generating, by the processor, a chain of title map comprising the first node and the second node, the chain of title map navigable for exploring a history of property rights to a location.

14. A method comprising:
   accessing, by one or more processors, document images comprising one or more of title documents for a property location or title opinions for the property location;

converting, by the one or more processors, the document images into text data associated with title documents and the title opinions;

generating, by the one or more processors and by using one or more trained models on the text data, a plurality of data objects, each data object comprising geographical location information, a description of rights to the geographical location information, and time information;

generating, by the one or more processors and by using the one or more trained models on the text data, rules comprising modifications to rights to a geographical location based on one of an event or time;

applying, by the one or more processors, the rules to the plurality of data objects to generate a data structure including nodes and edges, the nodes comprising modified data objects and the edges comprising connections between a first modified data object and a second modified data object.

15. The method of claim 14 further comprising:

generating, by the one or more processors and by using the one or more trained models on portions of the text data associated with the accessed title opinions, confidence levels associated with the edges and the nodes; and generating, by the one or more processors, a navigable interface comprising the data structure and a most recent node, a most recent modified data object of the most recent node including time information which includes a span of time contemporaneous to generation of the navigable interface;

wherein the navigable interface applies a color code to one of the edges or the modified data objects, the color code reflective of the generated confidence levels.

16. A system comprising:

one or more hardware processors; and a memory comprising instructions operable by the one or more hardware processors to:

access one or more electronic documents;

provide text of the electronic documents to a trained model to generate a first data object and a second data object, each data object comprising a property right, a length of time, and a location;

generate a relationship between the first data object and the second data object, the relationship associated with a change in property rights associated with the location;

generate a description of current property rights to the location based on one of first data object, the second data object, or the relationship, and the description comprising a predicted property right interest in the location; and generating a confidence level associated with the description of current property rights to the location.

17. A method for determining ownership interests in a property, the method comprising:

receiving, by a processor, electronic documents related to one or more property rights of one or more parties;

identifying, by the processor, a series of past property rights and identifications of preceding parties possessing the past property rights;

generating, by the processor, a current title status based on the series of past property rights and preceding parties; and generating, by the processor, a confidence level associated with the current title status.

18. The method of claim 17, wherein the property rights are related to a parcel of land.

19. The method of claim 17, wherein the property rights comprises one of an ownership interest, mineral rights, subsurface rights, or surface rights.

20. The method of claim 17, wherein the navigable interface further comprises interactable nodes associated with one or more of a span of time or an ownership interest.

21. The method of claim 20, wherein the navigable interface further comprises edges between the interactable nodes, the edges associated with a change in the past property rights.

22. The method of claim 17 further comprising:

generating, by the processor, a navigable interface comprising the series of past property rights, the identifications of the preceding parties, and the current title status;

wherein a user navigates a title history of a property through the navigable interface, the property associated with the one or more property rights.

23. The method of claim 22, further comprising identifying conflicting property rights based on the series of past property rights and preceding parties, and wherein the navigable interface comprises a visual element indicating the identified conflicting property rights.

24. The method of claim 23, wherein the visual element comprises a color coding.

\* \* \* \* \*